(12) United States Patent  (10) Patent No.: US 7,648,064 B2
Lamparello et al.  (45) Date of Patent: *Jan. 19, 2010

(54) REMOTE SYSTEM OVERRIDE

(75) Inventors: Drew Lamparello, Tega Cay, SC (US); Edward Tsang, Chatsworth, CA (US)

(73) Assignee: S1 Corporation, Atlanta, GA (US)

(*) Notice: Subject to any disclaimer, the term of this patent is extended or adjusted under 35 U.S.C. 154(b) by 279 days.

This patent is subject to a terminal disclaimer.

(21) Appl. No.: 11/319,028

(22) Filed: Dec. 27, 2005

(65) Prior Publication Data

US 2007/0145116 A1 Jun. 28, 2007

(51) Int. Cl.
*G06K 5/00* (2006.01)
*G06K 15/00* (2006.01)
*G06Q 20/00* (2006.01)

(52) U.S. Cl. .................... 235/382; 235/383; 705/16

(58) Field of Classification Search ........... 235/382, 235/383; 705/16; 379/188; 709/223
See application file for complete search history.

(56) References Cited

U.S. PATENT DOCUMENTS

| 6,013,107 | A | * | 1/2000 | Blackshear et al. | ......... | 709/229 |
| 2002/0169673 | A1 | * | 11/2002 | Prorock et al. | ............... | 705/16 |
| 2004/0049427 | A1 | * | 3/2004 | Tami et al. | .................... | 705/24 |
| 2004/0059634 | A1 | * | 3/2004 | Tami et al. | .................... | 705/17 |
| 2007/0150566 | A1 | * | 6/2007 | Lamparello et al. | ......... | 709/223 |
| 2007/0150567 | A1 | * | 6/2007 | Lamparello et al. | ......... | 709/223 |

* cited by examiner

*Primary Examiner*—Thien M. Le
*Assistant Examiner*—April A Taylor

(57) ABSTRACT

A workstation and a method for providing remote lockout override is disclosed. The workstation includes lockout functionality, wherein at least a portion of the functionality of the workstation is locked when a lockout module in the workstation detects a violation of a predetermined rule. The workstation includes an override request module that provides a user with a menu of active supervisors and sends an override request message to a supervisor selected from the menu of active supervisors. When the workstation receives an override response message that authorizes overriding the rule, the workstation is unlocked.

20 Claims, 7 Drawing Sheets

REMOTE SYSTEM OVERRIDE

RELATED APPLICATIONS

This application is related to copending U.S. patent application entitled "REMOTE SYSTEM OVERRIDE," filed on 27 Dec. 2005 having Ser. No. 11/319,030 and is related to copending U.S. patent application entitled "REMOTE SYSTEM OVERRIDE," filed on 27 Dec. 2005 having Ser. No. 11/319,029.

TECHNICAL FIELD

The present invention is generally related to providing customer service and, more particularly, is related to overriding lockouts.

BACKGROUND OF THE INVENTION

Today, a teller at a financial institution, e.g., banks, credit unions, savings and loans, etc., frequently uses a computer system or smart teller machine when providing services to a customer. (Hereinafter, teller computer systems and smart teller machines are referred to as workstations.) The teller uses the workstation to access financial records and to conduct transactions. Teller workstations normally include a rules engine, which verifies that the transactions being engaged in follow rules established by the financial institution. In the event that a transaction violates a rule, the rules engine detects the violation and signals a lock to engage. Once the lock is engaged, the lock prevents the workstation from completing the transaction.

To unlock the workstation, the teller must request an override from a supervisor. Normally, the teller determines which supervisor or supervisors are present to authorize an override, and may also have to decide which supervisor is not so busy that he or she cannot be interrupted. Then the teller requests the override. Normally, the supervisor must interrupt his or her work and come over to the workstation, at which point, the supervisor enters a code to unlock the workstation. While at the workstation, the supervisor might decide to authorize the transaction or deny the transaction.

Thus, a heretofore unaddressed need exists in the industry to address the aforementioned deficiencies and inadequacies.

SUMMARY OF THE INVENTION

Embodiments of the present invention provide a workstation and a method for remote lockout override.

Briefly described, in architecture, one embodiment of the workstation, among others, can be implemented as follows. The workstation includes a transaction module, an unlockable lock module, and a override request module. The transaction module enables the workstation to be used to engage a customer in a transaction. The unlockable lock module is configured to selectively lock the transaction module. The unlockable lock module locks the transaction module in response to detecting a violation of a rule. The override request module is configured to receive an override response message and analyze the override response message to determine whether the override response message includes an override authorization. In response to the override response message including an override authorization, the unlockable lock module unlocks the transaction module.

Embodiments of the present invention can also be viewed as providing methods of remote supervisory control of a workstation. In this regard, one embodiment of such a method, among others, can be broadly summarized by the following steps: providing a teller with a menu of active supervisors; receiving user input that selects one supervisor from the menu of active supervisors; sending from a first workstation an override request message to a second workstation, wherein the second workstation is associated with the selected supervisor; receiving an override response message; and analyzing the override response message to determine whether the override response message includes override authorization; and responsive to determining that the override response message includes override authorization, unlocking at least a portion of the first workstation.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be noted that embodiments of the invention are described in relation to a financial institution such as a bank, credit union, savings and loan. However, that is done merely for the sake of clarity. Those skilled in the art recognize that there a many environments in which a smart machine includes a lock for preventing transactions that violate predetermined rules. For example, a smart cash register might not allow a sales clerk to accept a check that is over the purchase price or that exceeds a predetermined amount or that exceeds the sales amount by a predetermined amount without an override from a supervisor. Those skilled in the art will recognize that embodiments of the invention can be implemented in many environments including environments beyond financial institutions.

Furthermore, although embodiments of the invention have been described in terms of "workstations" it is intended that workstations be construed in its broadest sense, beyond that of a mere computer. In a financial institution environment, a teller's workstation might be a smart teller machine, and in a retail sales environment, a workstation might be a smart register.

Figure 1:
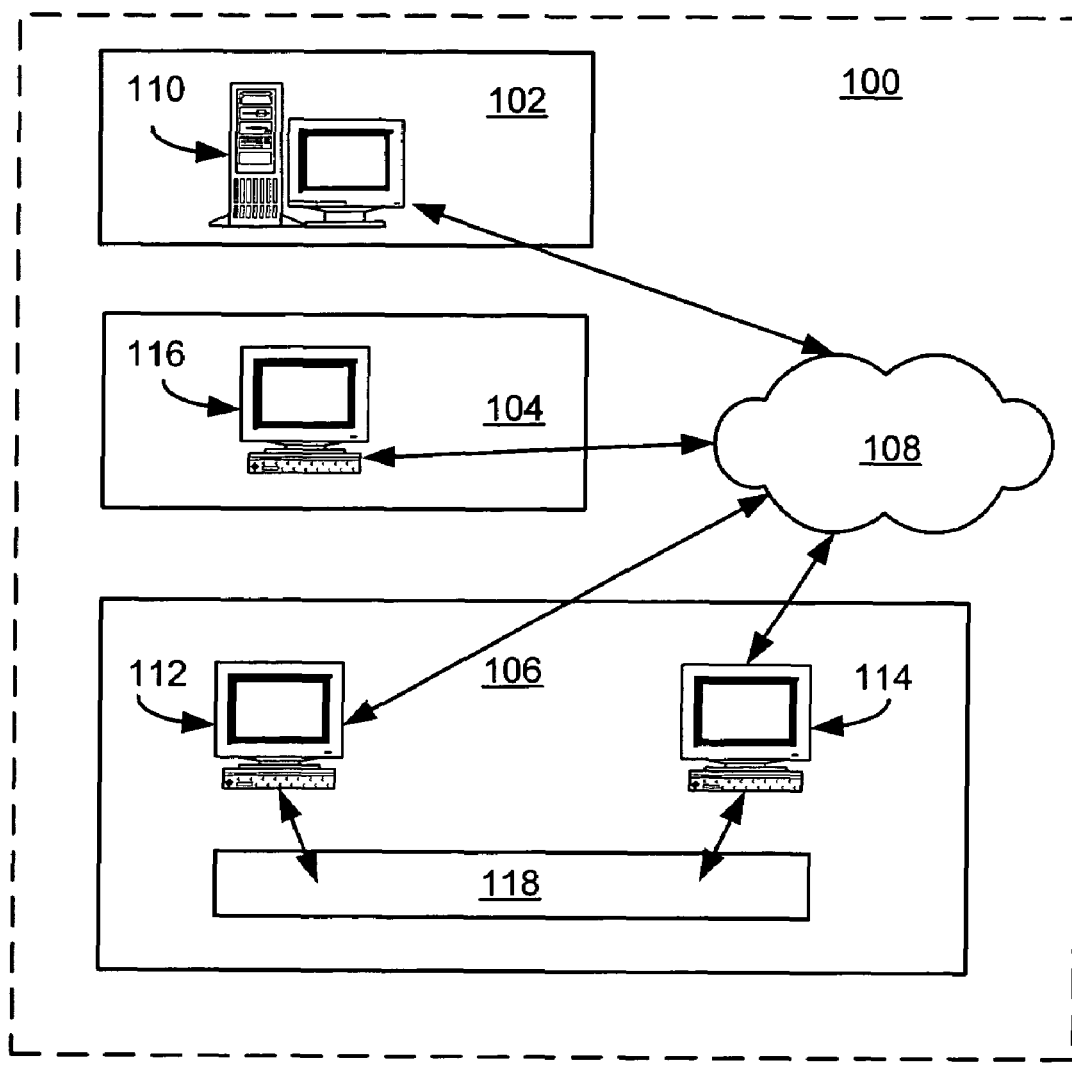
FIG. 1 is a block diagram of a financial institution having a server and a plurality of workstations.

Referring to FIG. 1, a financial institution 100 includes a plurality of offices 102, 104, and 106. Typically, financial institutions include more offices than the three illustrated here. The embodiment illustrated in FIG. 1 is for exemplary purposes only. In some situations, the offices may be distributed over a wide geographic region such as over one or more countries, or over one or more of the several states of the United States of America, or over a city. The offices 102, 104, and 106, are connected by a Wide Area Network (WAN) 108.

The financial institution 100 includes a server 110, workstation 112, 114, and 116. Typically, the workstation 114 is used by a teller or customer service provider, and the workstations 114 and 116 are used by supervisors. The workstation 112 and the workstation 114 are connected by a local area network (LAN) 118 and are in communication with the WAN 108. It should be noted that in addition to the workstation 112 and the supervisor workstation 114 the office 106 typically includes other workstations and other devices (not shown) such as, but not limited to, servers, coupled to the LAN 118. Furthermore, the other workstations and other devices are also normally in communication with the WAN 108. Thus, workstations 112 and 114 may communicate with each other via the LAN 118, and they may communicate both with each other and with the server 110 via the WAN 108.

It should also be noted that although the offices have been described as being distributed over a geographic region, in another embodiment, the offices might be virtual offices. For example, the financial institution 100 might define virtual offices by functions. Thus, a first virtual office such as office 104 might perform one function such as, but not limited to, processing credit card applications, and a second virtual office such as office 106 might perform another different function such as, but not limited to, loan processing. In a virtual office environment, employees who sit adjacent to each other might be in different virtual offices.

Figure 2:
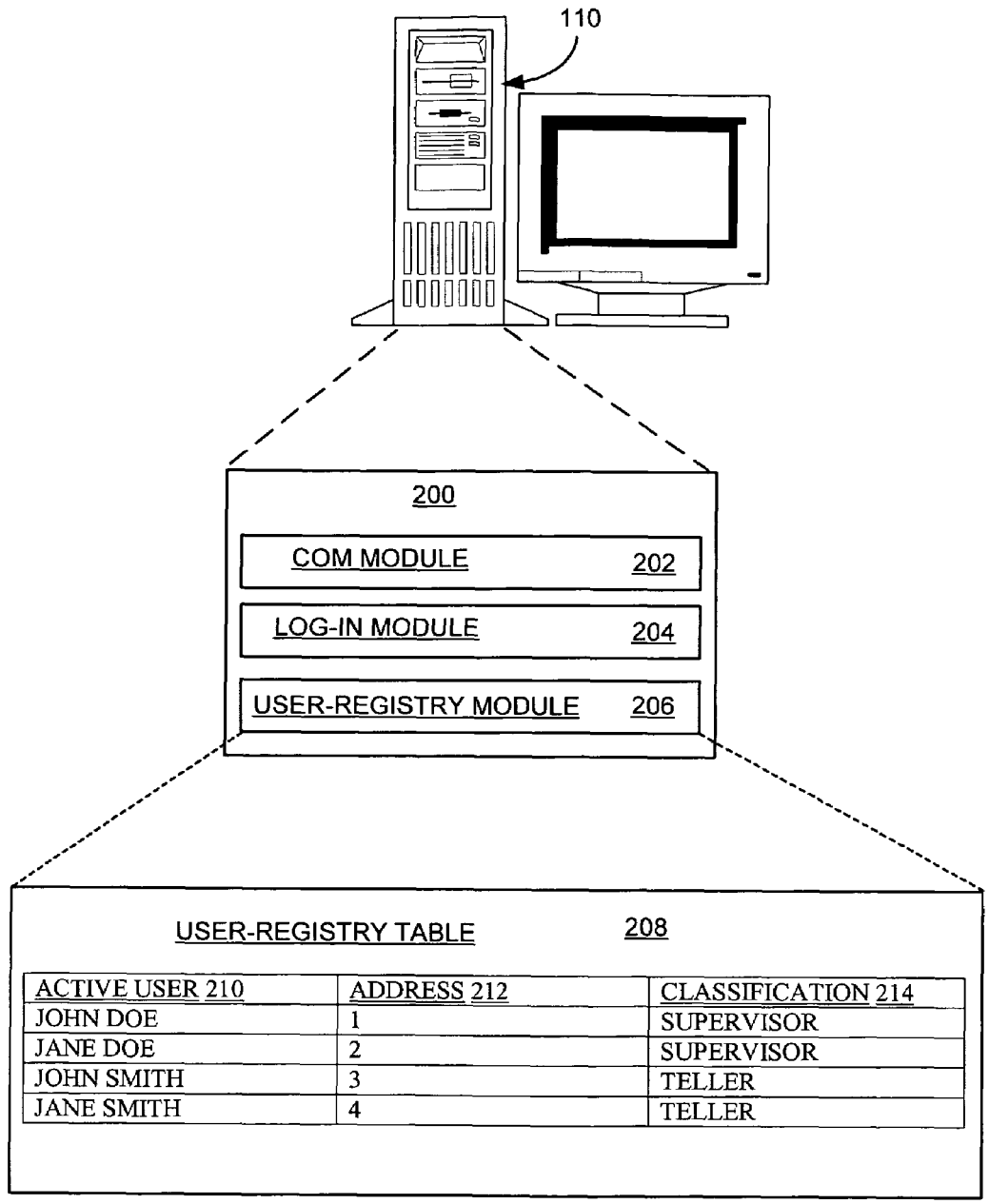
FIG. 2 is a block diagram of the server of FIG. 1.

Among other things, the server 110 provides log-in capability to, among others, employees, agents, and contractors, which are hereinafter referred to as users, of the financial institution. When a user attempts to access a workstation of the financial institution, the user must provide a username and password. The server 110 receives the usernames and passwords and verifies the provided usernames and passwords against authentic usernames and passwords, which it maintains. If the user has provided a correct username and password the server allows the user to log-in. As illustrated in FIG. 2, the server 110 includes a messaging service module 202, a log-in module 204, and a user-registry module 206. The messaging service module 202 provides communication capabilities. Among other things, the messaging service module 202 may be configured to provide Light Messaging Service (LMS).

In one embodiment, the log-in module 204 may be configured to, among other things, provide log-in capability and provide information to the user-registry module 206. Typically, the log-in module 204 receives log-in requests from the workstations when users attempt to log-in at the workstations. The log-in module 204 checks the username and password, which are included in the log-in request, against a list of authentic usernames and corresponding passwords. If a log-in request has a username and password that can be validated against the authentic usernames and corresponding passwords, the log-in module 204 allows the user at the workstation that transmitted the log-in request to log-in, thereby enabling the user to access the server 110. It should be noted that log-in capability could be, in other embodiments, provided by a separate server and/or by other modules such as the user-registry module 206. Furthermore, the financial institution 100 normally includes other servers (not shown), and a user is normally required to log-in so as to access the other servers. In some embodiments, the workstations are configured to provide only a "log-in" screen until a user has successfully logged-in. Thus, in some embodiments, users are denied access to the functionality of the workstations until after the user has logged-in.

Among other things, the user-registry module 206, receives information from the log-in module 204, maintains a user-registry table 208, and provides information to the workstations. The user-registry table 208 associates users that are currently logged-in with the workstation that the user used to access the server 110 and/or the functionality of the workstation. In one embodiment, the user-registry table 208 includes a column of active users 210, a column of workstation addresses 212, and a user-classification column 214. When a user logs-in, the user-registry module 206 updates the user-registry table 208 by adding the user's name to the active users column 210, adding to the workstation addresses column 212 the address of the workstation from which the user is logging-in, and associating a user classification with the user in the user classification column 214. Exemplary classifications of users include, but are not limited to, supervisor, teller, manager, etc. Typically, the server 110 includes for each user of the financial institution a user profile (not shown) that has the classification of the user. When the user logs-in, the log-in module 204 finds the user profile associated with the username and provides the user-registry module 206 with the user's name and/or username and/or with an indicator that is associated with the current user and the user's classification. Typically, the log-in request includes the address of the workstation from which the request came and the log-in module 204 may also provide the address of the workstation to the user-registry 206.

As will be explained in detail hereinbelow, the user-registry table 208 is used for, among other things, providing tellers with a list of active supervisors, i.e., supervisors that are currently logged-in. In some embodiments, the user-registry module 206 is configured to receive active-supervisor request messages. Upon receiving an active-supervisor request message, the user-registry module 206 provides the workstation that sent the request with an active supervisors table which includes the names of the active supervisors and the addresses of the workstations for those supervisors.

Figure 3:
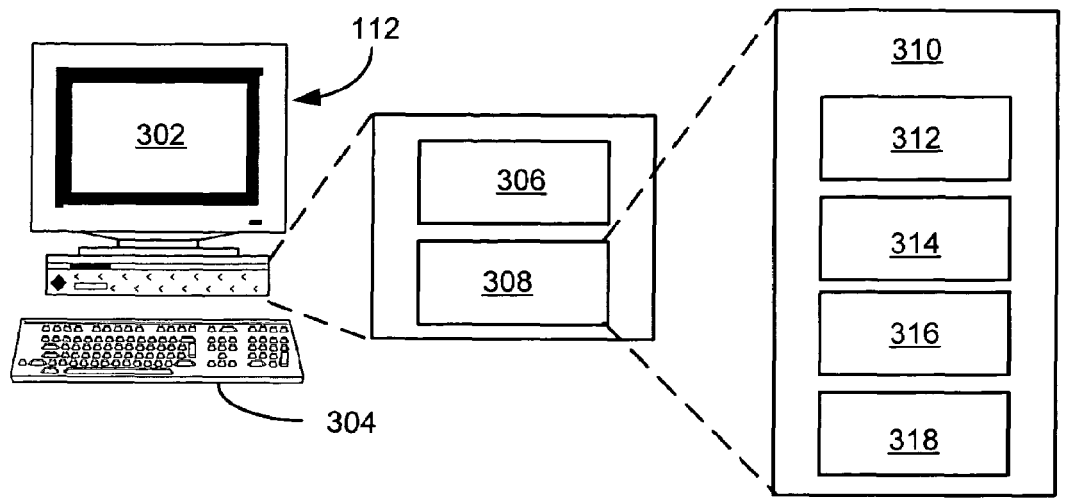
FIG. 3 is a block diagram of a teller's workstation.

An exemplary workstation 112 is illustrated in FIG. 3. The workstation 112 typically includes a computer or a device having computer functionality. Computers and computing devices are well known in the art, and consequently, the workstation is not discussed in detail. Instead, selected components of the workstation are described.

The workstation 112 includes a display device 302, an input device 304, a processor 306 and a memory 308 that has applications 310 stored therein. The display device 302 is used for, among other things, displaying textual and graphical information to a teller (not shown). The input device 304 is typically a keyboard or a keyboard and mouse or other input device such as, but not limited to, a touch screen, through which the teller inputs information.

The processor 306 executes the applications 310. Included in the applications 310 are a communication module 312, an unlockable lock 314, an override request module 316, and a transaction module 318. Among other things, the transaction module 318 is configured to provide functionality that enables a teller to conduct transactions such as, but not limited to, deposits, withdrawals, transfers, balance inquiries, etc.

The communication module 312 is configured to communicate with the server 110 and other devices such as the supervisor workstations 114 and 116 via the WAN 108 using a communication protocol such as, but not limited to, LMS. The communication module may also be configured to communicate with devices such as, but not limited to, supervisor workstation 114 via the LAN 118 using a communication protocol such as, but not limited to, Peer-to-Peer Messaging System (P2PMS).

The unlockable lock module 314 is configured to lock the transaction module 318 during a transaction when predetermined conditions are met. The unlockable lock 314 includes a rules engine that determines whether the current transaction violates a predetermined rule, and if so, the rules engine causes the unlockable lock 314 to lock or freeze the transaction module 318. For example, a rule can be that when a customer of the financial institution 100 deposits a check and requests cash back, the maximum amount of cash back that the user can receive is the amount available in the customer's account, i.e., the current value of customer's account excluding the amount of the deposited check until the check has cleared, at which time the amount of the check also becomes available. Thus, the rules engine will cause the unlockable lock 314 to lock the transaction module 318 if the teller attempts to provide the customer with more cash than the amount available in the customer's account.

It should be noted that, in one embodiment, the unlockable lock 314 locks the transaction module 318 in such a way the teller cannot complete the current transaction, but the unlockable lock module 314 does so without stopping all functionality of the workstation 112. In this embodiment, the override request module 316 is implementable even when the transaction module 318 of the workstation 112 is in the locked state.

Among other things, the override request module 316 provides an interface that allows a teller to request a supervisor to provide unlock authorization. When the override request module 316 is invoked, the override request module 316 attempts to contact the server 110 via the WAN 108. The override request module 316 sends an active-supervisor request to the server 110, which is a request a table of active supervisors. In one embodiment, the server 110 generates the active-supervisor table from the user registry table 208. In another embodiment, the server 110 may send the user-registry table 208, and the override request module 316 then determine which supervisors are active and from which workstations the supervisors are logged-in.

In one embodiment, if the server 110 does not respond to the active-supervisor request, then the workstation 112 determines, among other things, which supervisors are logged-in to workstations that are coupled to the LAN 118. Typically, the workstation 112 uses the communication module 312 to invoke a protocol such as P2PMS. The communication module 312 contacts active workstations that are coupled to the LAN 118 and queries the workstations as to the identity of the logged-in user. The active workstations respond with a message identifying the logged-in user and the classification of the logged-in user such as teller or supervisor. The override request module 316 is configured to generate a list of logged-in supervisors based upon responses from workstations coupled to the LAN.

It should be noted that the override request module 316 may also be configured to respond to queries. Thus, if the workstation 112 receives an active user query, i.e., a query regarding the identity of the current active user of the workstation 112, the override request module 316 may respond to the active user query by providing a reply that includes the name of the current user, or the username of the current user, or an indicator that is associated with the current user, and the classification associated with the current user. In some embodiments, the workstation 112 includes a user-profile having the classification of the current active user, and the override request module 316 uses the user-profile when responding to an active user query. In other embodiments, the workstation 112 receives the user's classification from the server 110. Normally, the workstation 112 receives the user's classification when the user logs-in to the server 110 and then stores the user's classification in memory 308.

Among other things, the override request module 316 may be configured to provide the teller with a menu of active supervisors. In some embodiments, the menu of active supervisors may include all active supervisors currently logged-in, i.e., those supervisors listed in the user-registry table 208. In some embodiments, the menu of active supervisors may include a subset of all active supervisors. By way of example, the menu of active supervisors may include only those supervisors who are currently active at a given office, which may or may not necessarily be the same office as the teller. The teller uses the menu of active supervisors to select a specific supervisor.

The override request module 316 may also be configured to generate an override request message and address the message to the workstation associated with the supervisor selected by the teller. The override request module 316 provides the override request message to the communications module 312 which transmits the override request message to the selected supervisor's workstation.

The override request module may also be configured to receive an override response message and to analyze the override response message. Among other things, the override response message may indicate authorization for overriding the rules engine, denial for overriding the rules engine, or maintaining the lock on the transaction module. The override request module determines the type of action indicated by the override response message. If the override response message authorizes overriding the rules engine, the override request module signals the unlockable lock module to unlock the transaction module 318. The override request module may also be configured to display on the display device the override response message to the teller.

In some embodiments, the override request module may be configured to capture transactional information and include the captured information in the override request message. For example, the override request module may capture the screen image of the display device 302 and may attach the screen image to the override request message. The supervisor may then open the attached image and use information contained therein in making the decision on whether to, among other things, grant or deny authorization or to request further information. It should be noted that attaching the image of the screen to the override request message is only one way of providing the content of the screen to the supervisor and is provided as a non-limiting example. In other embodiments, the image of the screen may be provided within the override request message, or may be provided with a separate message, or a link, such as a hyperlink, the image may be provided to the supervisor.

In some embodiments, the override request module may be further configured to allow the teller to cancel an override request. In some situations, the customer of the financial institution 100 may decide to cancel the transaction. In other situations, the teller may decide that the supervisor selected by the teller may not respond promptly, and consequently, the teller may decide to cancel the requested override and request an override request from a different supervisor. In yet another embodiment, the override request module may cancel an override request after a predetermined time span, which normally starts when the override request message is sent to workstation of the selected supervisor.

Figure 4:
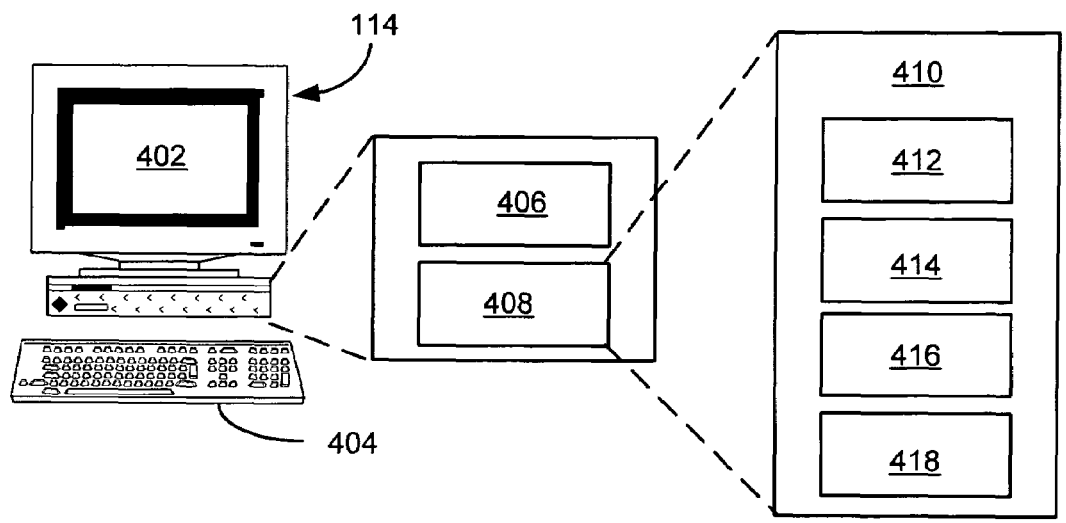
FIG. 4 is a block diagram of a supervisor's workstation.

FIG. 4 illustrates selected components of the supervisor's workstation 114. The workstation 114 typically includes a computer or a device having computer functionality. Computers and computing devices are well known in the art, and consequently, the workstation is not discussed in detail. Instead, selected components of the workstation are described.

The workstation 114 includes a display device 402, an input device 404, a processor 406 and a memory 408 that has applications 410 stored therein. The display device 402 is used for, among other things, displaying textual and graphical information to a supervisor (not shown). The input device 404 is typically a keyboard or a keyboard and mouse or other input device such as, but not limited to, a touch screen, through which the supervisor inputs information.

The processor 406 executes the applications 410. Included in the applications 410 are a communication module 412 and an override response module 414. The communication module 412 is configured to communicate with the server 110 and other devices such as the workstations 112 and 116 via the WAN 108 using a communication protocol such as, but not limited to, LMS. The communication module may also be configured to communicate with devices such as, but not limited to, workstation 112 via the LAN 118 using a communication protocol such as, but not limited to, P2PMS.

Among other things, the override response module 414 provides an interface that allows a supervisor to view an override request message and to provide an override response message. The override response module 414 may also be configured to respond to active user queries. If the workstation 114 receives an active user query, i.e., a query regarding the identity of the current active user of the workstation 114, the override response module 414 may respond to the active user query by providing a reply that includes the name of the current user, or the username of the current user, or an indicator that is associated with the current user, and the classification associated with the current user. In some embodiments, the workstation 114 includes a user-profile having the user's classification of the current active user, and the override response module 414 uses the user-profile when responding to an active user query. In other embodiments, the workstation 114 receives the user's classification from the server 110. Normally, the workstation 114 receives the user's classification when the user logs-in to the server 110 and then stores the user's classification in memory 408.

Among other things, the override response module 414 may be configured to provide the supervisor with a prompt when an override request message is received. The prompt might be an icon flashing on the display device 402, an audible prompt, or other type of prompt. The override response module 414 might also be configured to display indicators of pending override request messages. The override response module 414 may be configured to remove an indicator of an override request message when one of the override request messages is cancelled.

In some embodiments, the override response module 414 displays a window of pending override requests messages. The window can be automatically popped open on the display device 402 when an override request message is received. To respond to an override request message, the supervisor might select one of the override request messages being displayed in the window.

In some embodiments, the override response module may be configured to view captured transactional information, which may be included in the override request message, or attached to the override request message, or received in a separate message.

Figure 5:
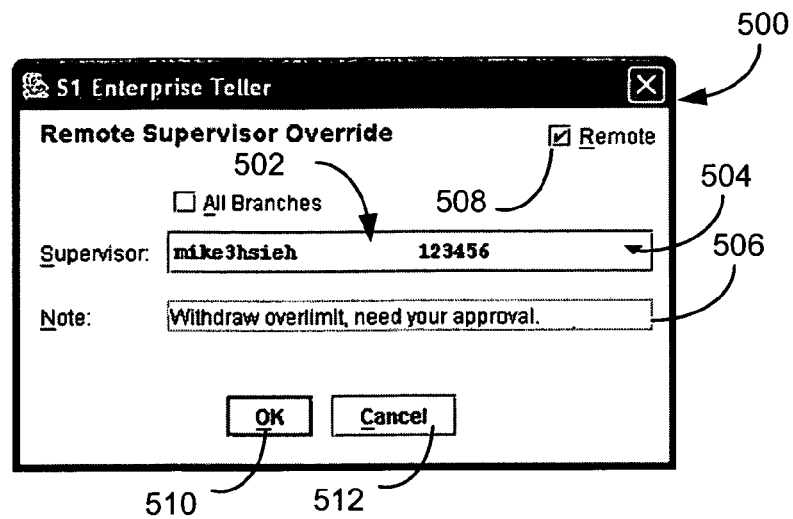
FIG. 5 is a block diagram of an override request interface.

FIG. 5 is an illustration of an override request interface 500 that is provided to the display device 302 by the override request module. The override request interface 500 includes a supervisor field 502 in which the name of the selected supervisor is displayed and a pull down tab 504. The teller uses the pull down tab 504 to see the menu of active supervisors. When the teller selects one of the supervisors, the selected supervisor's name is displayed in the supervisor field 502. The override request interface 500 also includes a note field 506 in which the teller may enter an explanation on why the override is requested.

In addition, the override request interface 500 may also include an office selector 508. When the office selector is checked, the menu of active supervisors includes all active supervisors and not just those supervisors in the same office as the teller, and when the office selector is unchecked, the menu of active supervisors may be limited to a subset of active supervisors. It should be noted that the subset of active supervisors can be chosen in many ways. As a non-limiting example, the subset of active supervisors might be those active supervisors who are in the same office as the teller.

The override request interface 500 also includes an "OK" button 510 and a "CANCEL" button 512. If the teller clicks on the "OK" button 510, an override request message is generated and sent to the workstation of the supervisor that was listed in the supervisor field 502. If the teller clicks on the "CANCEL" button 512, then no override request message is transmitted. Instead, in one embodiment, the override request interface 500 disappears from the display device 302.

Figure 6:
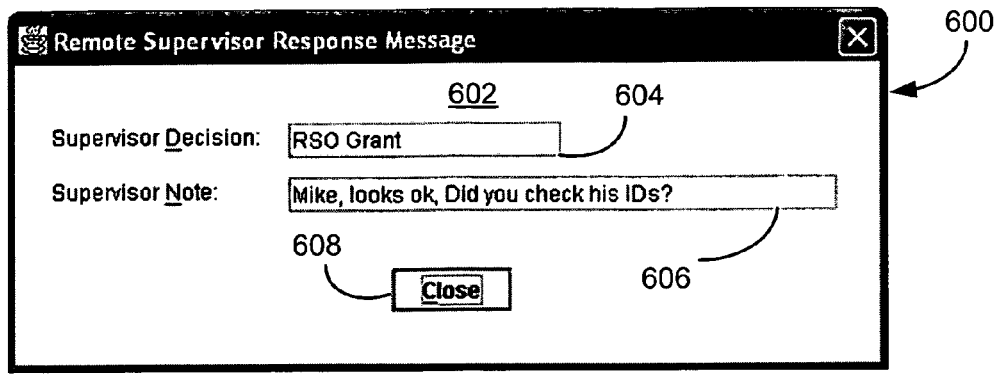
FIG. 6 is a block diagram of an override response message.

FIG. 6 is an illustration of a window 600 having an override response message 602. The window 600 is displayed on the display device 302. The override response message 602 includes a decision field 604 and a note field 606. The decision field 602 carries the decision of the supervisor. The override request module may be configured to read the decision field 602 and determine what action, if any, the supervisor has authorized. The note field 606 may carry a message from the supervisor to the teller. In some situations, the teller might decide to respond to the supervisor's note before proceeding with the transaction. In that case, the teller may use the override request module to transmit another message that will contain the teller's response to the supervisor's note. The window 600 may also include a "CLOSE" button 608. The teller may use the "CLOSE" button 608 to close the window 600.

Figure 7:
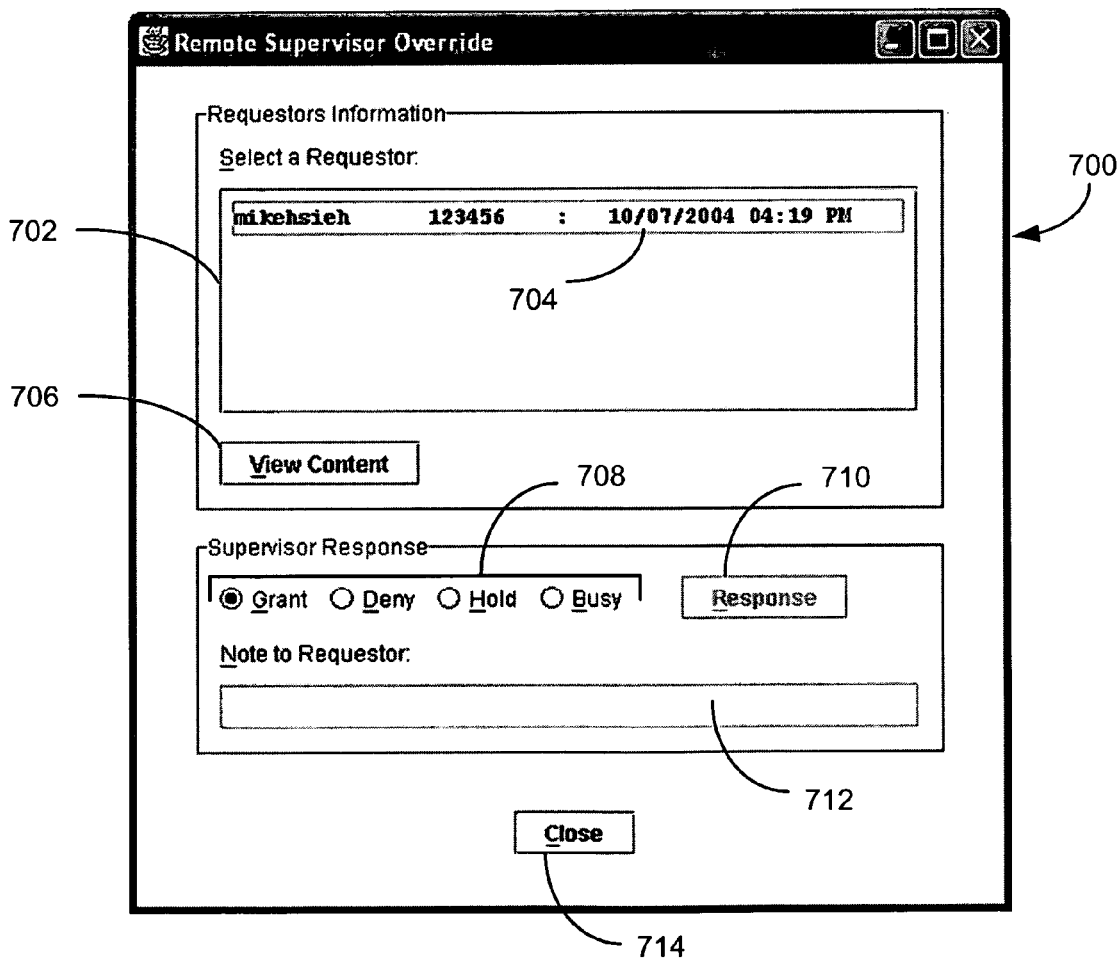
FIG. 7 is a block diagram of an override response interface.

FIG. 7 is an illustration of an override response interface 700 that is provided to the display device 402 by the override response module. The override response interface 700 includes an override request window 702 in which one or more message indicators 704 of pending override request messages are displayed. The supervisor can respond to a pending override request message by clicking on the message indicator 704. The supervisor may also use a "VIEW CONTENT" button 706 to view transactional information related to the selected override response message.

The override response interface 700 may also include a plurality of action buttons 708, which designate what action, if any, the teller should take. For example, the supervisor may click on a "GRANT" button for signifying approval of the override request, or click on a "DENY" button for signifying denial of the override request, or click on a "HOLD" button, which may signify that further information may be needed before the supervisor can grant or deny the override request, or click on a "BUSY" button, which may signify that the teller should send an override request to another supervisor.

The override response interface 700 may also include a "RESPONSE" button 710, a note field 712, and a "CLOSE" button 714. When the "RESPONSE" button 710 is clicked, an override response message is sent to the workstation that sent the selected override request message. The note field 712 may be used by the supervisor to send a note in the override response message to the teller. The "CLOSE" button 714 is used to close the override response interface 700.

Figure 8:
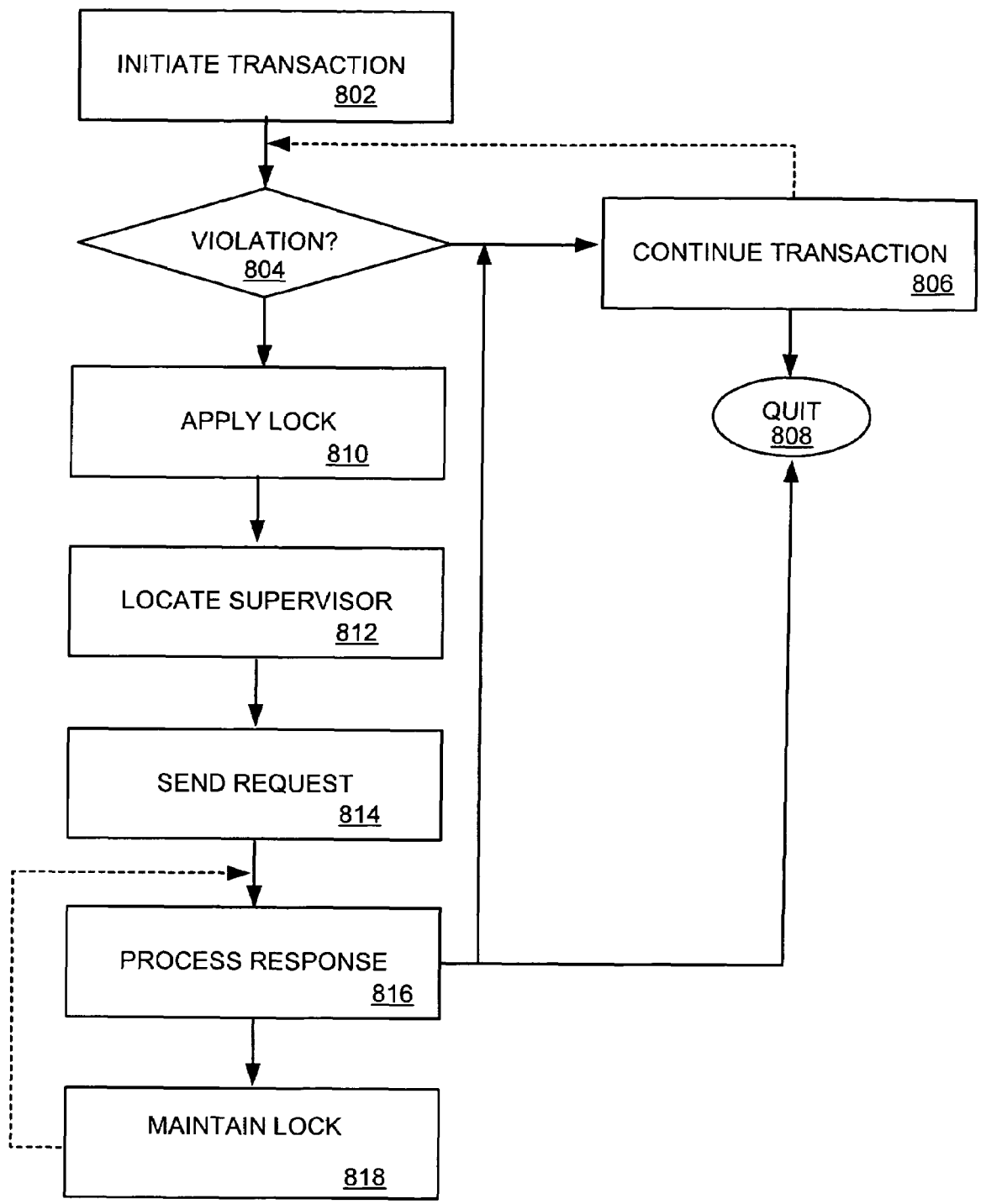
FIG. 8 is a flow chart of steps performed at the teller's workstation.

FIG. 8 is a flow chart illustrating exemplary steps 800 that may be performed at the financial institution. In step 802, a teller initiates a transaction with a user of the financial institution. In step 804, a rules engine monitors the transaction to determine whether, among other things, the steps violate any predetermined rule. If the no rules are being violated, then the process continues at step 806 and the transaction is continued. In some situations, a single transaction might involve multiple procedures by the teller, and in that case, the process loops back to step 804. If there has been no attempted violation of the rules, then the transaction is completed and ends at step 808.

On the other hand, when the rules engine determines that there has been a rule violation, then the process continues at step 810, where the state of the transaction module 318 of the workstation 112 is changed to "locked." In step 812, the teller selects an active supervisor from a list of active supervisors. As previously described, the list of active supervisors can be from information provided by the server 110 or by workstations coupled to the LAN 118. In step 814, the teller sends the override request message to the selected supervisor.

In step 816, the override response message from the supervisor is received and analyzed. Among other things, the override response message can authorize unlocking transaction module 318 and authorizing the transaction, thereby overriding the rules engine, unlocking transaction module 318 and denying the transaction, keeping the transaction on hold, which may be done so that the supervisor may request and receive more information. If the response denied the transaction, then the lock on the transaction module is unlocked and the process goes to step 808 and ends. On the other hand, if the response authorized the transaction, then the lock on the transaction module is unlocked and the process continues at step 806. At step 806, the transaction is normally conducted to completion, but in some situations, the process might loop back to step 804. If the override response message indicated keeping a hold on the transaction, the lock on the transaction module remains in place and the process continues at step 818.

In step 818, the teller generally provides the supervisor with further information, which may be provided by the customer of the financial institution. For example, the teller might ask to see identification and then inform the supervisor that the user's identification is correct. The process then continues at step 816.

Figure 9:
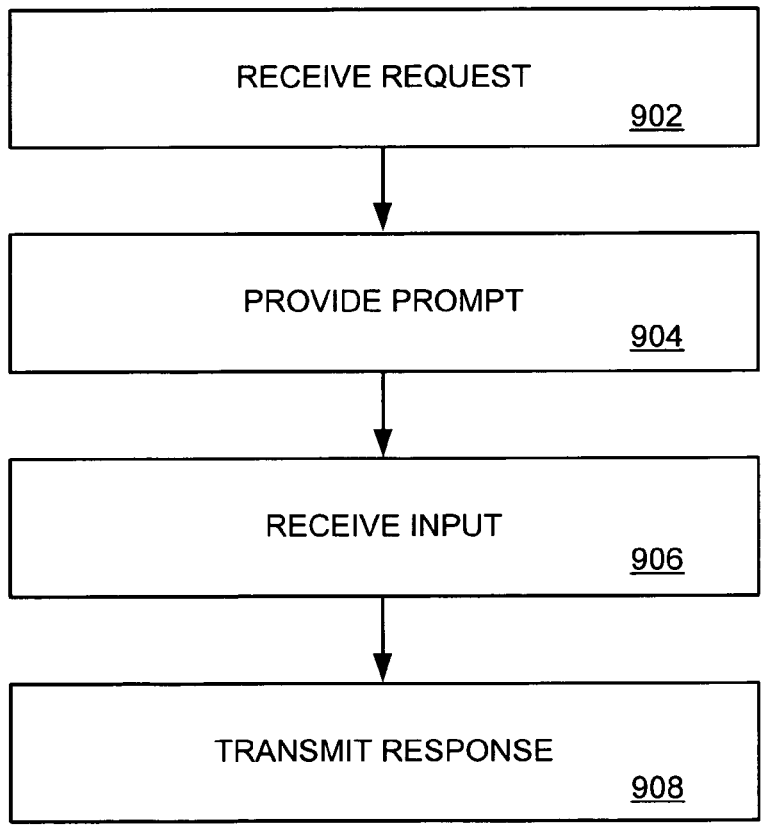
FIG. 9 is a flow chart of steps performed at the supervisor's workstation.

FIG. 9 illustrates steps 900 that may be performed at the supervisor workstation 114. In step 902, the workstation 114 receives the override request message. In step 904, a prompt is provided to the supervisor. The prompt might be a window that opens up on the display device of the workstation 114. The prompt might be an icon that appears on the display device, and the icon might flash. The prompt might be an indication displayed within a window that a message has been received.

In step 906, the supervisor reviews the request, and in step 908, the supervisor provides input. Among other things, the input of the supervisor might be to authorize the transaction, to deny the transaction, to keep a hold on the transaction, to request further information, etc. In step 908, the supervisor transmits a response back to the teller.

Figure 10:
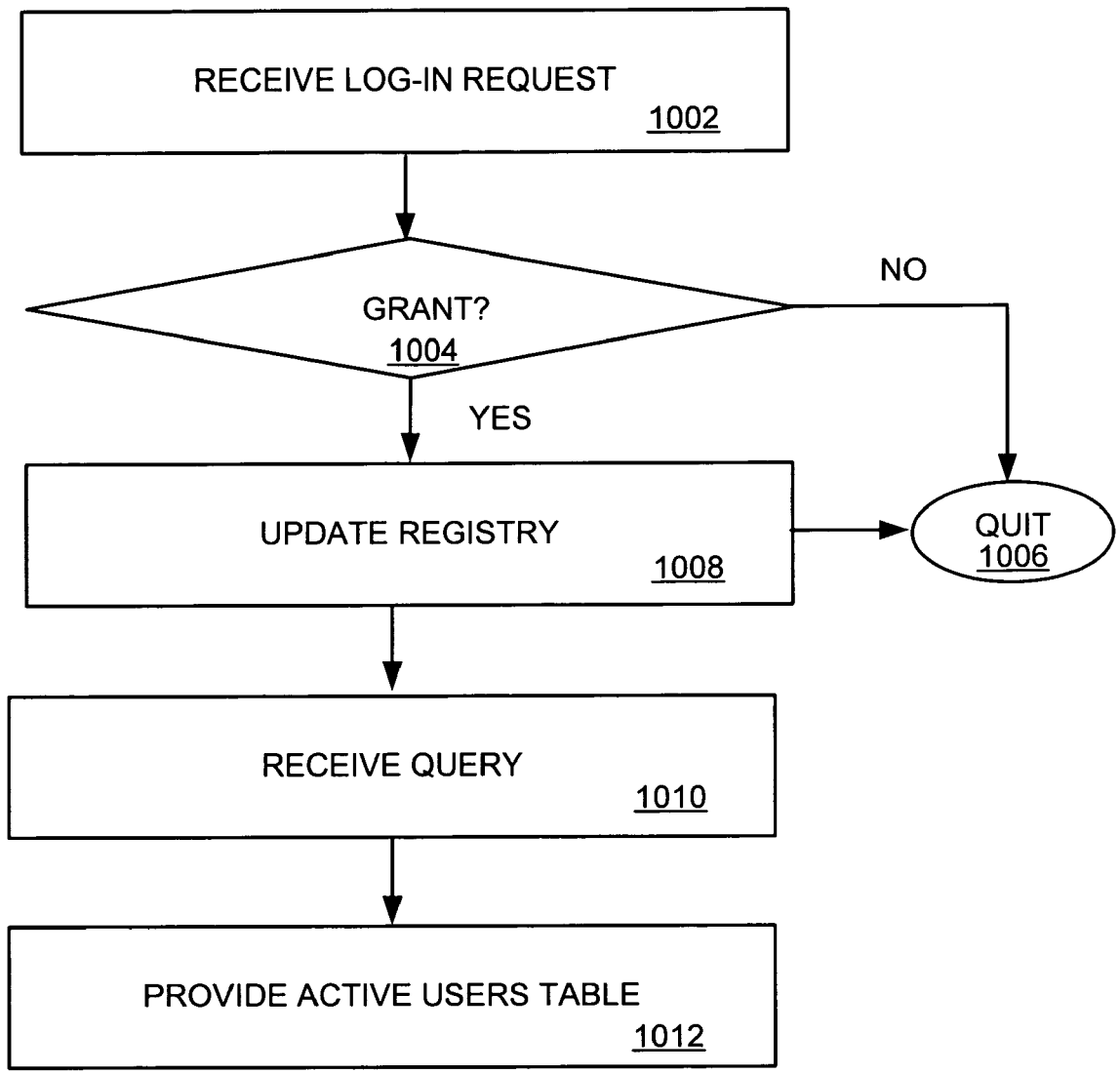
FIG. 10 is a flow chart of steps performed at the server.

FIG. 10 illustrates steps that may be performed at the server 110 or by the server 110 and other components such as one or more other servers (not shown) of the financial institution. In step 1002, a log-in request is received, and in step 1004, the log-in request, which includes a username and password, is compared to a list of authentic usernames and passwords. The log-in request is granted the received username and password are verified against the list of authentic usernames and passwords. If the log-in request is denied, then the process ends at step 1006, otherwise the process continues at step 1008.

In step 1008, a user profile is retrieved and the user-registry is updated. The user profile includes a classification for the user such as supervisor, teller, etc. The user-registry is updated to include the user, the address of the user's workstation, and, in some embodiments, the classification of the user.

In step 1010, an active-user request is received from a workstation, and in step 1012, a table of active users is provided to the workstation. In some embodiments, the table that is provided is the user-registry. In other embodiments, the table includes only users who are authorized to override lockouts.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method of remote supervisory control of a workstation, the method comprising the steps of:
   contacting a server via a first communication path, wherein the server maintains a user-registry table;
   responsive to failing to contact the server, sending an active user query out over a second communication path;
   receiving at least one response to the active user query; and
   using at least a portion of the at least one response to generate a menu of active supervisors;
   responsive to contacting the server, receiving an active users table;
   using at least a portion of the active users table to generate the menu of active supervisors;
   providing a teller with the menu of active supervisors;
   receiving user input that selects one supervisor from the menu of active supervisors;

sending from a first workstation an override request message to a second workstation, wherein the second workstation is associated with the selected supervisor;

receiving an override response message;

analyzing the override response message to determine whether the override response message includes override authorization; and responsive to determining that the override response message includes override authorization, unlocking at least a portion of the first workstation.

2. The method of claim 1, further including the steps of:
capturing transaction information; and
providing the transaction information to the selected supervisor.

3. The method of claim 2, wherein the transaction information includes information from a screen shot.

4. The method of claim 1, further including the step of:
enabling the teller to select a subset of active supervisors, wherein the provided menu of active supervisors consists of only supervisors in the subset of active supervisors.

5. The method of claim 1, further including the steps of:
engaging a transaction module for conducting a transaction with a customer;
determining whether the transaction violates a rule; and
responsive to determining that the transaction violates a rule, locking the transaction module.

6. The method of claim 1, wherein the step of unlocking at least a portion of the first workstation includes the step of unlocking a transaction module.

7. A workstation in a distributed institution, the workstation comprising:
a transaction module configured to enable a user to engage a customer in a transaction;
an unlockable lock module configured to selectively lock the transaction module, wherein the unlockable lock module locks the transaction module responsive to the current transaction violating a predetermined rule; and
an override request module, wherein the override request module is configured to receive an override response message and analyze the override response message to determine whether the override response message includes an override authorization, wherein the unlockable lock module unlocks the transaction module in response to the override response message including the override authorization.

8. The workstation of claim 7, further including:
a communication module, wherein the communication module is configured to contact a server having a user-registry table associating an active supervisor with workstations; and
wherein the override request module uses at least a portion of the user-registry table to provide a teller with a menu of active supervisors.

9. The workstation of claim 8, wherein responsive to the teller selecting a given supervisor from the menu of active supervisors, the override request module generates the override request message that is addressed to a given workstation, wherein the given workstation is associated with the selected supervisor.

10. The workstation of claim 8, wherein the user-registry table is updated in response to another supervisor logging-in.

11. The workstation of claim 8, wherein the communication module is configured to send an active user query in response to failing to communicate with the server, wherein the server and the workstation are connected by a first communication path, and the active user query is sent over a second communication path.

12. The workstation of claim 11, wherein the workstation receives via the second communication path at least one response to the active user query, wherein at least a portion of the response is used to generate the menu of active supervisors.

13. A method of remote supervisory control of a workstation, comprising:
engaging a transaction module for conducting a transaction with a customer;
capturing transaction information;
determining whether the transaction violates a rule;
responsive to determining that the transaction violates a rule, locking the transaction module;
providing transaction information to a first identified party having supervisory authority, the first identified party selected from a list of identified parties having authority to override a locked transaction module;
receiving an override authorization message from the first identified party;
unlocking the transaction module; and
completing the transaction.

14. The method of claim 13, wherein providing transaction information to a first identified party is responsive to making a selection from a list of presently active supervisors from a user-registry table.

15. The method of claim 14, further comprising:
deselecting the first identified party; and
selecting a second identified party different from the first identified party from the list of presently active supervisors.

16. The method of claim 15, wherein deselecting the first identified party and selecting a second identified party different from the first identified party is responsive to a predetermined time span.

17. The method of claim 15, wherein deselecting the first identified party and selecting a second identified party different from the first identified party is responsive to a user input.

18. The method of claim 13, wherein providing transaction information to a first identified party comprises generating a prompt at the workstation where the first identified party is presently logged-on.

19. The method of claim 13, wherein providing transaction information to a first identified party comprises displaying a window of pending override request messages at the workstation where the first identified party is presently logged-on.

20. The method of claim 13, wherein prior to receiving the override authorization message the workstation receives an indication that further information is needed before the first identified party can provide the override authorization.

* * * * *